Sept. 29, 1936.  A. Y. DODGE  2,055,601

LUBRICATING DEVICE

Filed Sept. 17, 1931

INVENTOR.
ADIEL Y. DODGE
BY John A. Watson
ATTORNEY.

Patented Sept. 29, 1936

2,055,601

UNITED STATES PATENT OFFICE 2,055,601

LUBRICATING DEVICE

Adiel Y. Dodge, South Bend, Ind., assignor to The Lubrication Corporation, South Bend, Ind., a corporation of Delaware Application September 17, 1931, Serial No. 563,418

8 Claims. (Cl. 184—105)

This invention relates to lubrication devices and more particularly to librication fittings for bearings which are to be lubricated.

One of the objects of the invention is to provide a new and improved fitting capable of being manufactured at relatively small cost and at the same time capable of operating efficiently under all usual conditions.

Further objects will be apparent after reading the subjoined specification and claims and after consideration of the accompanying drawing.

Figure 5 is a central section of a modified form of fitting; and

Figure 1:
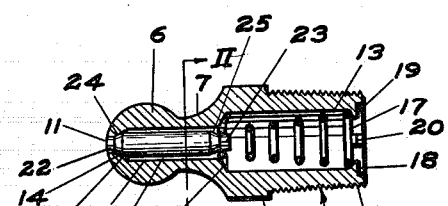
Figure 1 is a view in section of a fitting illustrating my invention.

Referring particularly to the drawing, I have shown in Figure 1 a fitting generally designated 5 formed with a ball head 6, a reduced neck 7, a hexagonal wrench receiving portion 8, and a threaded shank 9. The fitting is formed with three concentric bores of different diameters. The bore 11 in the outer part of the head 6 has the smallest diameter; the bore 12 extending downward through the greater part of the head 6, and through the neck 7, has a slightly larger diameter; and the bore 13 extending throughout the shank portion 9 and the wrench receiving portion 8 has the largest diameter. Between the bores 11 and 12 there is formed an annular sloping shoulder 14 and between the bores 12 and 13 there is formed an annular sloping shoulder 15. Positioned within the concentric bores is a valve member 16 normally held in the position shown by a conical spring 17, the base of said spring resting upon a seat formed by a plurality of upset or sheared portions such as those shown at 18, 19 and 20.

Figure 2:
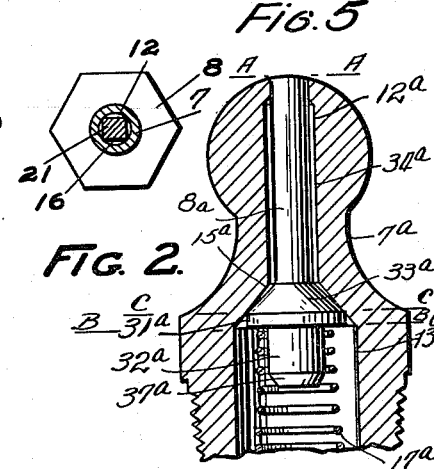
Figure 2 is another view in section of said fiting taken substantially on the line II—II of Figure 1.

The valve member 16 preferably is formed from wire or bar stock having flat sides. As shown most clearly in Figure 2 the main part 21 of the valve is of square section and as shown in Figure 1 this main part 21 is provided with oppositely extending projections 22 and 23. The projections 22 and 23 are exactly alike and are of round cross section considerably smaller than the cross section of the main body portion 21. Intermediate the projections 22 and 23 and the main portion 21 beveled portions 24 and 25, respectively are formed. Thus the valve member 16 is exactly symmetrical and is therefore reversible so that either end may be dropped into the fitting body and the cost of assembling it in the fitting is made relatively low. The reduced round portion 22 may serve either as a guide for the upper end of the valve, aiding to maintain the valve in position by its movement within the bore 11, or as a guide for the apex of the spring 17. The beveled portion 24 may serve as a valve coacting with the sloping shoulder 14 or may serve as a seat for the apex end of the spring 17. By the use of flat sided wire or bar stock of proper size, it may be seen that the corners (which are preferably smoothed off or rounded) of the main portion of the valve contact with the sides of the bore, thus effectively guiding the valve within the bore, and at the same time allowing the passage of lubricant past the flat sides without requiring any additional operations upon the valve or fitting to provide guides for the valve or to provide grooves for the passage of lubricant. Incidentally, a slightly smaller quantity of metal is required than would be necessary were the valve made of round wire of a diameter equaling the diameter of the bore 12, machined down to proper size for operation in the fitting casing.

As stated above, the valve 16 preferably is made from wire or bar stock having flat sides but the stock may be triangular in cross section, hexagonal in cross section, or have any other suitable number of sides. It may be easily machined to the proper shape in an automatic screw machine with very little shaving of metal, thus saving in the cost of replacements of cutting tools. The casing or body of the fitting may also be formed on an automatic screw machine, the exterior being formed by shaving operations, and the interior by drilling, both the exterior and the interior being formed with one single handling of the fitting by the machine.

I prefer to assemble the parts of the fitting in the following manner. The valve 16 is inserted through the large bore 13 and thereafter the spring 17 is also inserted through said bore, allowing the base thereof to protrude a short distance out of said fitting. The fitting is then suitably held, as in a die, and a press having a diameter substantially corresponding to the diameter of the bore 13, but having suitably shaped projections spaced around it for forming the sheared portions or spring retaining lugs 18, 19 and 20, moves into contact with the outer end of the spring, pushing it down until it is flush with the outer end of the shank 9 and then upsetting portions of the fitting body to form the portions or lugs 18, 19 and 20. The sheared portions themselves in bending and shearing are interposed between the press and the spring, thus contacting with the lower end of the spring 17, and compressing it to the position shown in Figure 1.

Figure 3:
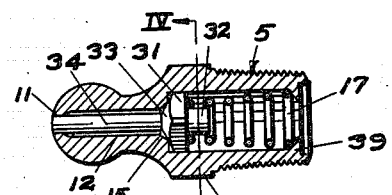
Figure 3 is a view in section of another form of fitting.

In Figure 3 I have shown a modified form of fitting but have designated like parts by like reference numerals. The fitting has an outer casing or body generally designated 5, and a spring 17. However, the valve member itself differs from the valve member 16. Like the valve member 16 it may be formed from flat sided wire or bar stock, but this stock must be relatively larger than the stock required for the formation of the valve member 16, the fitting bores being of the same size. Moreover, though two of the fittings shown and described have this feature in common, yet I do not desire that my invention shall be understood to be limited to a flat sided valve inasmuch as important features of the invention are as well applicable to round valves. In the form used for illustration (as may be seen most clearly in Figure 4) the valve member has a main portion 31 which is square in shape with the corners smoothed off. This portion may, if desired, be four-sided or square, as shown, three-sided or triangular, or of any other shape having flat sides, or as stated above, may even be round in cross section. The exterior of the main portion 31 corresponds normally to the exterior of the wire or bar stock from which the valve member is formed. On one side of the main portion 31 the valve member has been reduced to a rounded projection or stem 32 which serves as a guide for the upper part of the spring 17. On the other side of the main portion 31, the valve member is formed with a beveled face 33 which extends between said main portion and an elongated stem or projection 34 of reduced and rounded cross section. The stem 34 extends throughout the bore 12 and into the bore 11 and serves as a guide for positioning the valve within the casing 5, and the beveled face 33 normally seats with a circular line contact on the annular sloping shoulder 15 to form a lubricant-tight seal.

Provision is made so that the valve may be quite easily opened by lubricant pressure and so that an improved lubricant tight seal is formed. As may be seen most clearly in Figure 6, the outer end of the stem 34 does not completely fill the bore 11, a small clearance being provided for purposes which will be later described. This clearance need not be very large. For instance, assuming that the ball head has a diameter of approximately 0.25 inch, the diameter of the valve stem may be of the order of 0.060 inch, and the diameter of the bore may be of the order of 0.063 inch. The end of the stem 34 should be rounded as at 35 on a radius and from a center corresponding to the radius and center of the ball head 6.

The angle of the annular sloping shoulder 15 does not correspond exactly to the angle of the beveled face 33. As shown, the beveled face 33 makes a larger angle with the axis of the fitting than the annular shoulder 15. I prefer to form the beveled face 33 so that it makes an angle with the axis of the valve of about 48 degrees and so to form the annular shoulder 15 that it makes an angle of about 43 degrees. It may be clearly seen that by this arrangement a line contact is provided by means of which is it possible to obtain a more perfect seat and it is possible more surely to prevent the escape of lubricant past the valve. By reason of the line contact the two coacting valve parts may be pressed more firmly together and any film of oil squeezed out. As stated, I prefer to make the angle of the beveled face 33 larger than the angle of the sloping shoulder 15. However, if desired, the angle of the sloping shoulder 15 could be made larger than the angle of the beveled face 33, and a line contact obtained at the junction of the sloping shoulder 15 and the bore 12.

But by reason of the line contact adjacent to the large bore 13, a further important object is accomplished. As stated, the end of the stem 34 does not completely fill the bore 11. Therefore, when the lubricant under pressure is supplied to the fitting it acts on the rounded surface 35 to push the valve down against the spring 17 and also goes in through the clearance provided and acts on the beveled face 33. Inasmuch as the surface of the latter is much larger than the surface of the rounded end 35, a much greater hydraulic pressure is brought to bear on the valve and against the spring and thus the valve is more quickly and more positively opened. Inasmuch as the line contact illustrated exposes a larger surface of the beveled face 33 to the action of the lubricant under pressure than would be exposed by a line contact at the junction of the sloping shoulder 15 and the bore 12, it may be understood why I prefer to have the angle of the sloping shoulder 15 smaller than the angle of the beveled face 33 especially when provided in combination with the feature of the clearance provided in the bore 11.

The shoulder 14 between the bores 11 and 12 forms an angle with the axis of the fitting of approximately 20 degrees and I have found that this angle assures the best performance. The angle may be decreased (with slight disadvantages) to 15 degrees and may be increased (also with slight disadvantages) to 40 degrees. Beyond these limits, however, the fitting operates poorly. If the angle is increased too greatly, a too large movement of the valve member becomes necessary in order to open the valve sufficiently to allow the passage of an adequate amount of lubricant. If the angle is increased too greatly, the end 35 tends to catch on the shoulder and the valve tends to stick open, especially when it becomes relatively dry.

Figure 4:
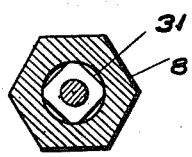
Figure 4 is a view in section of the fitting shown in Figure 3, taken substantially on the line IV—IV of said figure.
Figure 6:
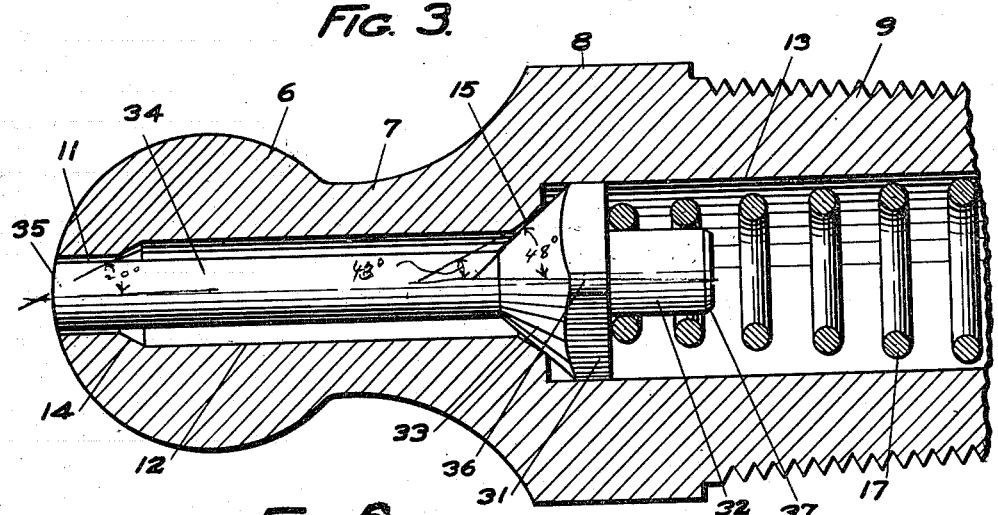
Fig. 6 is a sectional view on an enlarged scale of the fitting shown in Figure 3.

As may be seen most clearly in Figures 4 and 6, the corners of the main portion 31 are smoothed off as at 36 in order to prevent scoring of the casing in the bore 15. The lower end of the stem 32 is chamfered as at 37 in order to aid in the insertion of the spring 17.

In Figure 5 I have shown a portion of a fitting very similar to the fitting shown in Figures 3, 4 and 6. Therein a casing having a reduced neck portion 7a, a wrench receiving portion 8a, and a plurality of concentric bores, such as 12a and 13a, is provided. Positioned in the bores is a valve member having a beveled surface 33a adapted to contact with the annular shoulder 15a and having oppositely extending stems 32a and 34a, and a spring 17a. The body portion 31a, however, is round instead of flat sided and has a diameter sufficiently small that adequate space for the passage of lubricant is provided between said main body portion 31a and the circumference of the bore 13a. The sloping shoulder 15a is preferably formed so that it makes an angle of about 43 degrees with the axis of the valve and the beveled surface 33a is preferably formed so that it makes an angle of about 48 degrees with said axis of the valve. Thus there is provided a line contact similar to that which is provided in the fitting shown in Figure 6. However, it is to be noted that the sloping shoulder 15a extends clear to the outlines of the bore 13a and thus it is possible to arrange the line contact nearer to the junction of the sloping shoulder 15a with the bore 13a and at the very edge of the beveled surface 33a. To accomplish this desirable object it is necessary that the several parts have proper relative dimensions. For instance, in a fitting having a ball head with a radius of 0.250 inch, I prefer to form the bore 12a with a diameter of approximately 0.081 inch, and the bore 13a with a diameter of 0.187 inch. It has been found preferable to have the distance between the planes A—A and B—B approximately 0.395 inch and I prefer to form the valve member so that the distance between the outer end of the stem and the plane C—C is approximately 0.380 inch. Thus the distance between B—B and C—C (when the valve is in its normal closed position) or in other words the distance measured along the axis of the fitting from the plane of the junction between the sloping shoulder and the large bore to the line contact of the valve is approximately 0.015 inch.

It is to be understood that the above described embodiments are for the purpose of illustration only, and various changes may be made therein without departing from the spirit and scope of the invention.

I claim:

1. A lubrication fitting comprising a casing formed with a plurality of bores, an annular shoulder between two of the bores, said annular shoulder making an angle with the axis of the fitting of approximately 43 degrees, and a valve member positioned in one of said bores and having a reduced stem extending through another of said bores to the surface of the casing and having a beveled surface to cooperate with said shoulder and having the bevel formed at an angle of approximately 48 degrees with the axis of the fitting thereby to provide an annular line contact of relatively large diameter between said shoulder and said valve.

2. A lubrication fitting comprising a casing formed with a pair of concentric bores of different diameters and with an annular shoulder formed between said bores, said shoulder making an acute angle with the axis of the fitting; and a valve member positioned within one of said bores and having a reduced stem extending through another of said bores to the surface of the casing and having a beveled surface, a part of which is adapted to contact with the annular shoulder; said beveled surface making an acute angle with the axis of the fitting slightly larger than the acute angle made by said annular shoulder thereby to provide an annular line contact of relatively large diameter between said shoulder and said valve.

3. A lubrication fitting comprising a casing formed with a pair of concentric bores of different diameters and having a sloping shoulder between said bores; a valve member positioned in one of said bores having a pair of oppositely extending projections one of which extends through the other of said bores to the surface of the casing and having a beveled surface circular in outline, a part of which is adapted to contact with a part of said shoulder; and a spring bearing upon said valve member; said annular shoulder making an angle with the axis of the fitting of approximately 43 degrees, and said beveled surface making an angle with the axis of the fitting of approximately 48 degrees thereby to provide an annular line contact of relatively large diameter between said shoulder and said valve.

4. A lubrication fitting comprising a casing formed with a small bore, with a bore of intermediate diameter concentric with said small bore, with a bore of large diameter concentric with said small bore and said bore of intermediate diameter, and with annular shoulders between said bore of small diameter and said bore of intermediate diameter and between said bore of intermediate diameter and said bore of large diameter; and a valve member positioned in said bores comprising a main body portion formed with a beveled surface cooperating with the last named annular shoulder, and having an outwardly projecting stem extending from said main body portion through said bore of intermediate diameter and said bore of small diameter to the surface of the casing; the diameter of said stem being slightly smaller than the diameter of said small bore, the first named annular shoulder making a relatively small angle with the axis of the fitting, and the angle made by said beveled surface with the axis of the fitting being slightly larger than the angle made by said last named annular shoulder with the axis of the fitting.

5. A lubrication fitting comprising a casing formed with a concentric bore of relatively small diameter and a concentric bore of relatively large diameter; a valve member for said casing provided with a stem, said stem extending into said small bore and having a diameter corresponding approximately to the diameter of said small bore but slightly smaller than said diameter of said small bore so that a clearance is provided for the passage of small quantities of lubricant into said large bore.

6. In a lubrication fitting, a casing comprising a body portion having a ball head, a reduced neck portion, a hexagonal wrench receiving portion, a threaded shank portion, and formed with three concentric bores of different diameters, the junction between the bore of largest diameter and the bore of intermediate diameter being formed with a sloping valve seat; a valve member positioned within said bores, said valve member being formed with a flat sided body positioned in said bore of largest diameter and a beveled surface forming a greater angle with the axis of the bores than the angle formed by the valve seat and normally resting upon said beveled valve seat, an elongated stem of reduced round cross section extending through said bore of intermediate diameter and into said bore of small diameter, and a short stem, also of round cross section formed on the opposite side of said flat sided body; and a spring mounted in said bore of large diameter and having one end encircling said short stem and resting against said flat sided portion.

7. A lubricant receiving fitting comprising, a casing having a nozzle contacting surface, said casing being formed with a bore of relatively large diameter and a coaxial concentric lubricant conducting passageway, said passageway terminating in a portion of reduced diameter in said contacting surface, and a valve member in said casing bore, said valve being formed with a stem having a diameter approximating the diameter of said reduced portion of said passageway but slightly smaller and extending through said passageway to the outer surface of said casing thereby to provide a clearance between the portion of reduced diameter of the passageway for the passage of lubricant into the casing.

8. A lubricant receiving fitting comprising a casing having a nozzle contacting surface, said casing being formed with a passageway therethrough one end of which terminates in an inlet orifice of relatively small diameter in said contacting surface, the walls of said passageway within the casing providing a valve seat of relatively large diameter, and a valve located within the passageway and adapted to rest beyond said valve seat, said valve having a stem extending outwardly therefrom through the passageway to said inlet orifice and having its outer end flush with said contacting surface, the diameter of said stem being slightly less than the diameter of said inlet orifice thereby providing an annular clearance space between the stem and the wall of said orifice through which lubricant under pressure may be admitted into the passageway.

ADIEL Y. DODGE.